United States Patent [19]

Pittman et al.

[11] Patent Number: 4,613,002
[45] Date of Patent: Sep. 23, 1986

[54] DOWNHOLE DRILLING TOOL WITH IMPROVED SWIVEL

[75] Inventors: Paul R. Pittman, Round Rock; Floyd L. Scott, Jr.; William R. Hamilton, both of Austin, all of Tex.

[73] Assignee: Hughes Tool Company, Houston, Tex.

[21] Appl. No.: 605,536

[22] Filed: Apr. 30, 1984

[51] Int. Cl.$^4$ .............................................. E21B 4/02
[52] U.S. Cl. .................................. 175/107; 175/228; 384/93
[58] Field of Search ............... 175/107, 227, 228, 320; 384/93; 184/6.18; 415/175; 418/48

[56] References Cited

U.S. PATENT DOCUMENTS

| | | | |
|---|---|---|---|
| 1,576,370 | 3/1926 | Scott | 175/228 |
| 3,075,781 | 1/1963 | Atkinson et al. | 277/83 |
| 3,971,450 | 7/1976 | Fox | 175/107 |
| 4,114,703 | 9/1978 | Matson, Jr. et al. | 175/107 |
| 4,256,189 | 3/1981 | Fox et al. | 175/40 |
| 4,260,202 | 4/1981 | Crase et al. | 308/8.2 |
| 4,284,149 | 8/1981 | Fox | 175/40 |
| 4,324,299 | 4/1982 | Nagel | 175/107 |
| 4,372,400 | 2/1983 | Beimgraben | 175/228 |
| 4,386,667 | 6/1983 | Millsapps, Jr. | 175/228 |
| 4,493,381 | 1/1985 | Kajikawa et al. | 175/107 |

Primary Examiner—James A. Leppink
Assistant Examiner—William P. Neuder
Attorney, Agent, or Firm—Robert A. Felsman; H. Dennis Kelly

[57] ABSTRACT

A downhole drilling tool having a tubular stem connected to the drill string, and a tubular housing mounted concentrically and rotatably on the stem, forming an annular space between the housing and the stem. A plurality of bearings within the annular space support the housing against radial and longitudinal thrust loads. A plurality of seals within the annular space above and below the bearings form a lubricant chamber. The housing has a cylindrical lubricant passage extending between the lubricant chamber and the annular space outside of the lubricant chamber. A cylindrical piston is sealably slidable within the lubricant passage and responds to pressure of the drilling fluid entering the passage from the exterior of the housing to force lubricant out of the passage and into the lubricant chamber in order to replace lubricant which is lost therefrom. A downhole drilling motor is attached to the lower end of the housing. The drilling motor has a stator and a rotor which is rotated with respect to the stator in response to the flow drilling fluid through the drilling motor.

3 Claims, 5 Drawing Figures

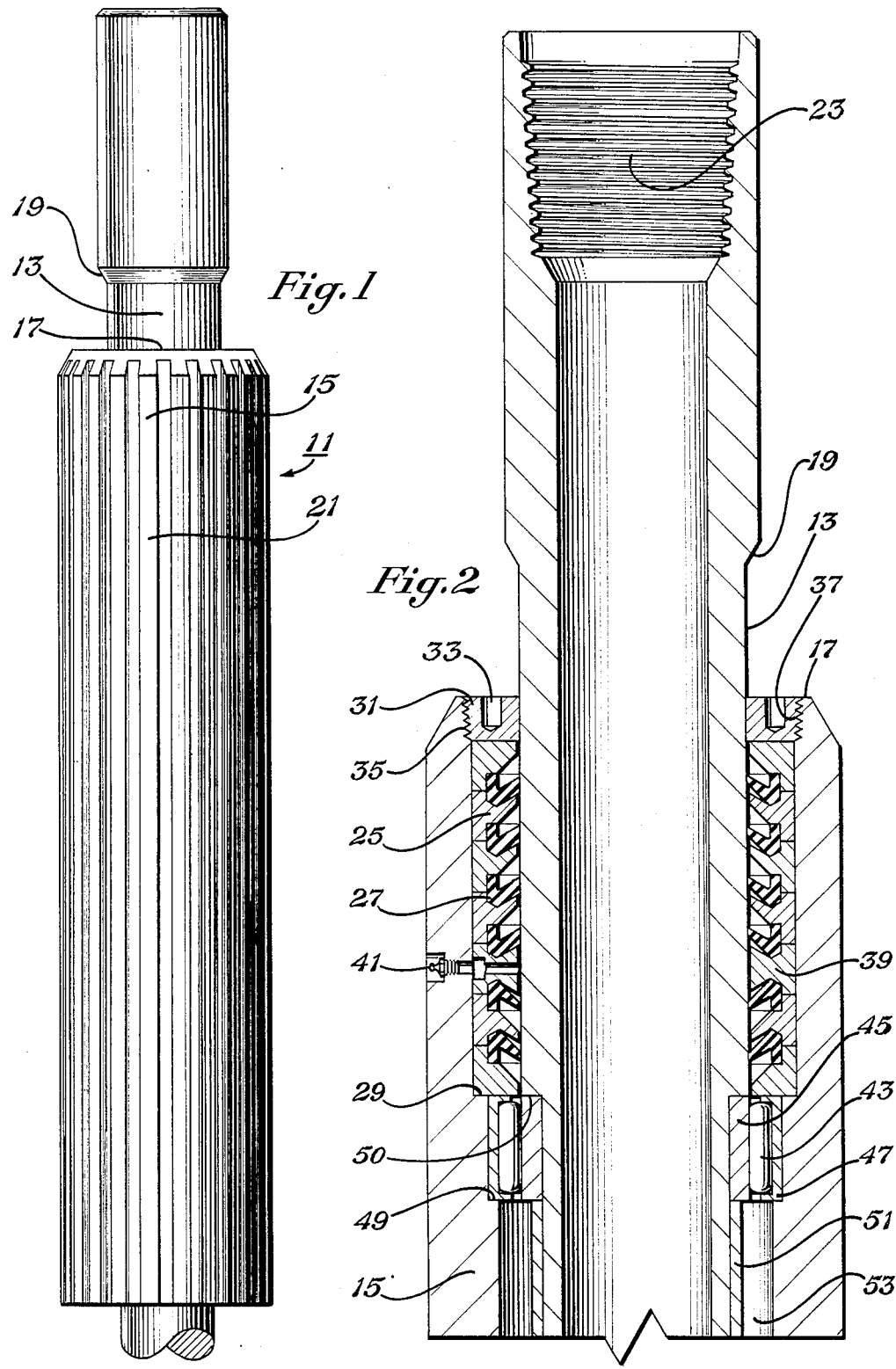

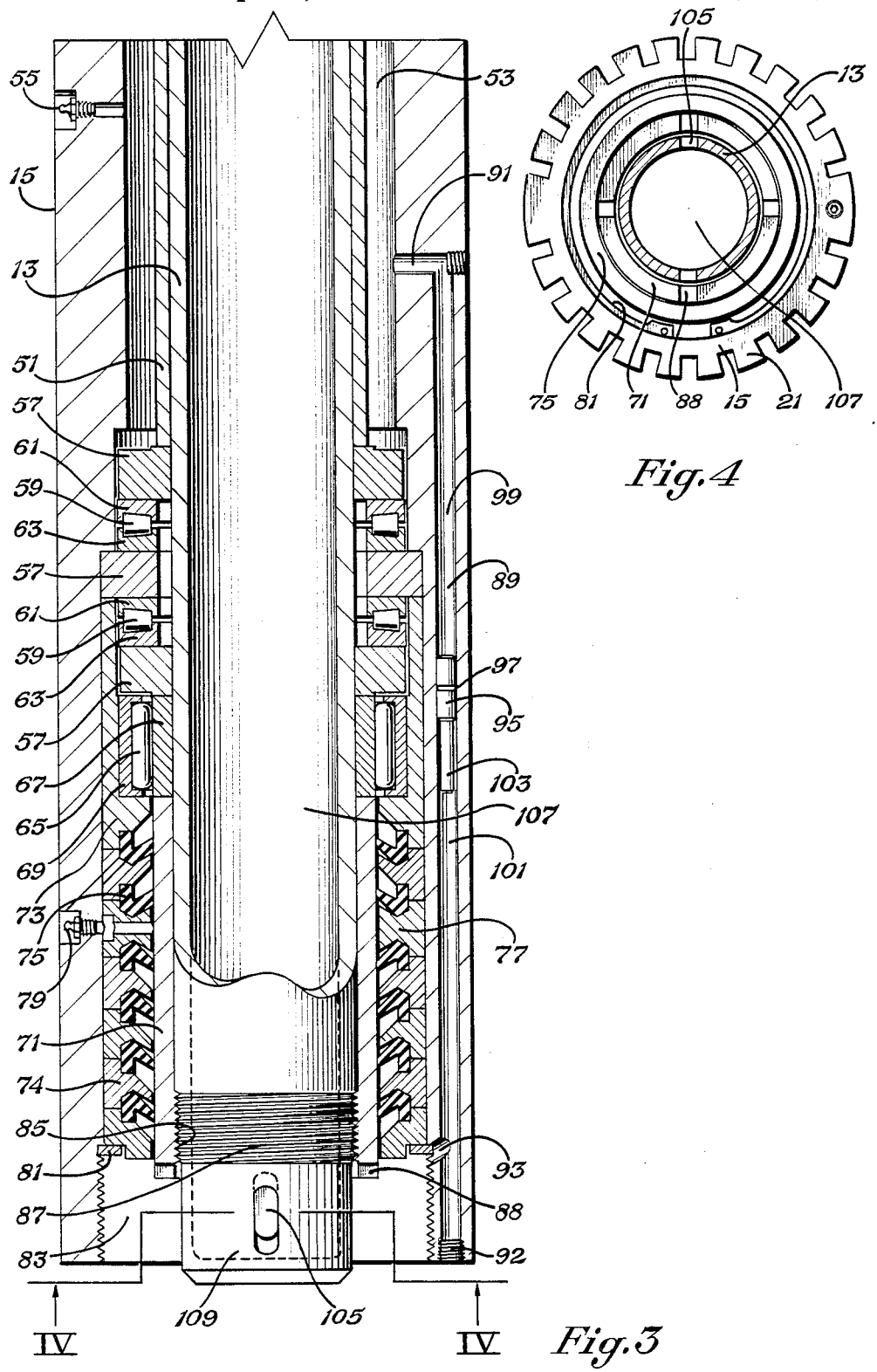

DOWNHOLE DRILLING TOOL WITH IMPROVED SWIVEL

BACKGROUND OF THE INVENTION

1. Field of the Invention

This invention relates in general to downhole drilling tools, and in particular to swivels for use with downhole drilling motors.

2. Description of the Prior Art

A downhole drilling motor, or mud motor, is a drilling tool which rotates a drill bit in response to drilling mud being circulated down the interior of the drill string and back up the annulus between the drill string and the sides of the drilled hole. Since mud motors make it unnecessary to rotate the drill string, such motors are particularly useful in drilling directional holes.

A downhole drilling motor has a stationary member, which is connected to the drill string, and a rotating member, which connects to the drill bit. The stationary member and the rotating member are separated by radial and thrust bearings, which may be cooled directly by the drilling mud or sealed in lubricant. Either the stationary member or the rotating member may be located radially outward from the other member.

The rotary seals used to seal downhole drilling motors have a longer useful life if the seals are kept lubricated. As lubricant leaks past the seals, new lubricant must be introduced into the lubricant chamber to maintain and replenish the lubricant around the sealed area. Several methods of replenishing the lubricant are known. U.S. Pat. Nos. 4,114,703 (Matson, Jr. et al.); 4,256,189 (Fox et al.); and 4,284,149 (Fox) each show well drilling tools in which the pressure of the drilling fluid moves a piston to force additional lubricant into the lubricant chamber. In each of these tools, the piston is an annular ring and operates within an annular lubricant passage.

SUMMARY OF THE INVENTION

The improved downhole drilling tool of the invention has a tubular housing, mounted concentrically and rotatably on a tubular stem, forming an annular space between the housing and the stem. A plurality of bearings are mounted within the annular space to support the housing against radial and thrust loads. A plurality of seals are mounted within the annular space above and below the bearings to form a lubricant chamber. The tubular housing has a cylindrical lubricant passage which communicates with the lubricant chamber and with the annular space outside of the lubricant chamber. A cylindrical piston is sealably slidable within the lubricant passage and responds to the pressure of the drilling fluid entering the passage from the annular space outside of the lubricant chamber. The piston forces lubricant out of the passage and into the chamber in order to replace lubricant which is lost by leakage past the seals. The rotor of a downhole drilling motor is attached to the lower end of the housing. A stator is located within the rotor and the rotor rotates with respect to the stator in response to the flow of drilling fluid through the downhole drilling motor.

The above, as well as additional objects, features, and advantages of the invention, will become apparent in the following detailed description.

BRIEF DESCRIPTION OF THE DRAWINGS

FIG. 1 is a side view of a downhole drilling tool.

FIG. 2 is a sectional view of the upper portion of the downhole drilling tool.

FIG. 3 is a sectional view of the intermediate section of the downhole drilling tool.

FIG. 4 is a sectional view as seen along line 4—4 in FIG. 3.

DESCRIPTION OF THE PREFERRED EMBODIMENT

Figure 5:
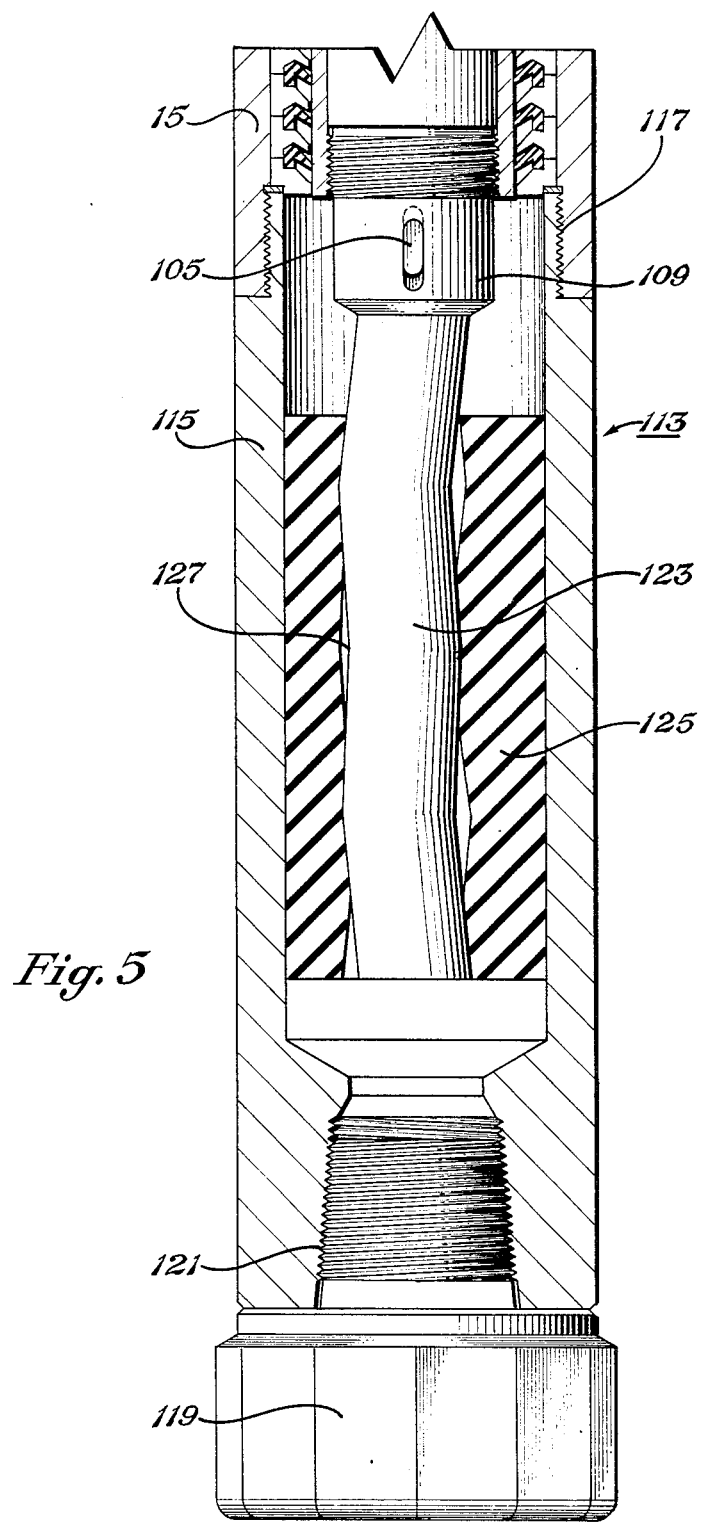
FIG. 5 is a sectional view of the lower section of a downhole drilling tool.

FIG. 1 depicts the preferred embodiment of the swivel 11 for use with a downhole drilling tool. The swivel 11 has a stationary stem 13 and a rotatable housing 15. The stem 13 and the housing 15 are both tubular, and the housing 15 is mounted concentrically and rotatably on the outer surface of the stem 13. The stem 13 extends upward beyond the upper end 17 of the housing 15. Near the upper end of the stem 13, the outer circumference of the stem 13 increases forming a downward facing shoulder 19. Cooling fins 21, around the circumference of the housing 15, increase the surface area of the housing 15 in order to facilitate cooling of the housing 15. As seen in FIG. 2, the upper end of the stem 13 has internal threads 23 for connection to a pin on the bottom of a drill string (not shown).

A plurality of backup rings 25 and seals 27 are located between the stem 13 and the housing 15. Near the upper end of the housing 15, an upper set of backup rings 25 and seals 27 is held in place between a shoulder 29, on the inner circumference of the housing 15, and an upper packing retaining nut 31. The upper packing retaining nut 31 has a plurality of drilled holes 33 to facilitate the threading of the retaining nut 31 into the upper end of the housing 15. The threads 35 on the outer circumference of the retaining nut 31 correspond to threads 37 on the inner circumference of the housing 15. A brass support ring 39 is situated among the backup rings 25 and seals 27 to provide support. A grease fitting 41 provides a means for injecting lubricant within the seals 27. The grease fitting 41 would be sealed against mud static pressure encroachment before the tool is put into a well. The backup rings 25 and seals 27 outboard of the support ring 39 are oriented to oppose the entrance of drilling fluid into the housing 15, and the backup rings 25 and seals 27 inboard of the support ring 39 are oriented in the opposite direction to oppose the escape of lubricant from the housing 15. Upper radial bearings 43 are located between an inner race 45 and an outer race 47, which are located between the bottom backup ring 25 and a shoulder 49 on the inner circumference of the housing 15. The inner race 45 is located between a shoulder 50 on the outer circumference of the stem 13 and a bearing separator sleeve 51.

The bearing separator sleeve 51 is a cylindrical sleeve which fits snugly around the outer circumference of the stem 13, but is smaller than the inner circumference of the housing 15. An annular lubricant chamber 53 is thus formed between the outer circumference of the bearing separator sleeve 51 and the inner circumference of the housing 15. A grease fitting 55 (FIG. 3) provides means for inserting lubricant into the lubricant chamber 53. The grease fitting 55 would be sealed against mud static pressure encroachment before the tool is put into a well.

FIG. 3 illustrates the intermediate section of the swivel 11. Immediately below the bearing separator sleeve 51 are three bearing support rings 57, separated by two sets of thrust bearings 59. Each set of thrust bearings 59 has an upper race 61 and a lower race 63. Lower radial bearings 65 are located immediately below the bottom bearing support ring 57. The lower radial bearings 65 have an inner race 67 and an outer race 69. The inner race 67 is held in place between the bottom bearing support ring 57 and a lower bearing retaining nut 71. A cylindrical bearing support sleeve 73 is located around the lower thrust bearings 59 and the lower radial bearings 65.

A lower set of backup rings 74 and seals 75 is located below the bearings, between the lower packing retaining nut 71 and the housing 15. The backup rings 74 and seals 75 are supported by a brass packing support ring 77, which has a grease fitting 79 so that lubricant may be inserted into the annulus between the seals 75 and the lower bearing retaining nut 71. The backup rings 74 and seals 75 inboard of the support ring 77 are oriented to oppose the escape of lubricant from the lubricant chamber 53, and the backup rings 74 and seals 75 outboard of the support ring 77 are oriented in the opposite direction to oppose the entrance of drilling fluid into the lubricant chamber 53. The seals 75 are held in places by a seal retaining ring 81, which is in turn held in place by a groove on the inner circumference of the housing 15, above internal threads 83 on the bottom of the housing 15. The lower packing retaining nut 71 has internal threads 85 which mate with external threads 87 on the outer circumference of the stem 13. The portion of the lower bearing retaining nut 71 which extends below the threads 85 has fours slots 88, so that the retaining nut 71 can be screwed tightly into place.

At least one cylindrical lubricant passage 89 passes through the housing 15, radially outward from the thrust bearings 59, the lower radial bearing 65, and the lower set of seals 75. The upper end 91 of the lubricant passage 89 communicates with the annular lubricant chamber 53. The outer end of the lubricant passage 89 is plugged with a pipe plug 92 after the lubricant passage 89 has been drilled. Near the pipe plug 92 the lubricant passage 89 has a port 93 which communicates with the interior of the housing 15, below the seals 75. A cylindrical piston 95 is reciprocally located within the lubricant passage 89. A seal 97 around the piston 95 separates lubricant in the upper portion 99 of the lubricant passage 89 from drilling fluid in the lower portion 101 of the lubricant passage 89. A smaller diameter tail 103 is attached to the bottom of the piston 95, to keep the piston 95 from moving below the port 93.

Slightly below the external threads 87 on the outer circumference of the stem 13, the stem 13 has a plurality of passages 105 between the bore 107 of the stem 13 and the exterior of the stem 13. The bore 107 ends just below the passages 105, and the stem becomes a solid shaft 109. As can be seen more easily in FIG. 4, the passages 105 in the stem 13 allow drilling fluid to flow from the bore 107 of the stem to the annulus between the shaft 109 and the housing 15.

As shown in FIG. 5, a downhole drilling motor 113 has a cylindrical rotor 115 which is attached to the housing 15 by means of a threaded section 117. A drill bit 119 is threaded to the lower end of the rotor 115 by means of threads 121. The downhole motor 113 also has a stator 123 which is rigidly attached to the shaft 109. An elastic sleeve 125 separates the rotor 115 and the stator 123 of the downhole motor 113. The elastic sleeve 125 cooperates with the stator 123 to create a positive displacement motor, so that as drilling fluid flows through the passage 127 between the elastic sleeve 125 and the stator 123, the drilling fluid rotates the elastic sleeve 125 and the rotor 115.

In operation the drill string and the stem 13 are held relatively stationary while drilling fluid is pumped down through the bore 107. When the drilling fluid reaches the passages 105 in the stem 13, the drilling fluid passes out of the bore 107 through the passage 105 into the annulus between the rotor 115 and the stator 123 of the downhole motor 113. The drilling fluid then flows through the passage 127 between the elastic sleeve 125 and the stator 123 of the downhole motor 113. The action of the drilling fluid passing through the downhole motor 113 causes the elastic sleeve 125 and the rotor 115 to rotate. The housing 15 and the drill bit 119 are rigidly connected to the rotor 115, and are also rotated by the action of the drilling fluid. The drilling fluid exits the drill bit 119 and returns upwards through the annulus between the downhole motor 113 and the edge of the drill hole, returning to the surface with cuttings from the bottom of the hole.

As the housing 15 of the swivel 11 rotates, the thrust bearings 59 and the radial bearings 43, 65 support the housing against radial and thrust loads. Lubricant within the lubricant chamber 53 lubricates the bearings to extend bearing life. The seals 27, 75 hold the lubricant within the lubricant chamber 53, and exclude the drilling fluid from the lubricant chamber 53. A small amount of lubricant leaks past the seals 27, 75, thus extending seal life. As lubricant is lost from the lubricant chamber 53, the pressure of drilling fluid in the lower portion 101 of the lubricant passage 89 forces the piston 95 upwards in the lubricant passage 89. The piston 95 forces lubricant out of the upper portion 99 of the lubricant passage 89 and into the lubricant chamber 53 to replace lubricant lost past the seals 27, 75. The drilling fluid pressure in the lubricant passage 89 comes from the annulus between the shaft 109 and the housing 15 through the port 93.

The improved swivel of this invention has significant advantages over the prior art. The piston 95 and the lubricant passage 89 of the invention are significantly smaller and simpler than the devices used in the prior art. By providing longer bearing life and seal life, the invention allows longer drilling runs between times when the tool must be removed from the hole for servicing.

While the invention has been shown in only one of its forms, it should be apparent to those skilled in the art that it is not so limited, but is susceptible to various changes and modifications without departing from the spirit thereof.

We claim:

1. A swivel for use with a downhole well drilling motor, said swivel comprising:
   a tubular stem adapted to be connected to a drill string;
   a tubular housing, mounted concentrically and rotatably on the stem, forming an annular space between the housing and the stem, said housing being adapted to connect to the downhole well drilling motor;
   bearing means within the annular space for supporting the housing against radial and longitudinal thrust loads;

seal means within the annular space, above and below the bearing means, for forming a lubricant chamber, said housing having a cylindrical lubricant passage, one end of the passage communicating with the lubricant chamber, and the other end of the passage communicating with the annular space outside of the lubricant chamber, and the passage having a longitudinal axis laterally offset from the longitudinal axis of the housing; and a cylindrical piston sealably slidable within the lubricant passage in response to pressure of drilling fluid entering the lubricant passage from the annular space to force lubricant out of the passage and into the chamber in order to replace lubricant which is lost therefrom.

2. A swivel for use with a downhole well drilling motor, said swivel comprising:

a tubular stem adapted to be connected to a drill string;

a tubular housing, mounted concentrically and rotatably on the stem, forming an annular space between the housing and the stem;

a plurality of bearings within the annular space to support the housing against radial and longitudinal thrust loads;

a plurality of seals within the annular space, above and below the bearings, to form a lubricant chamber, said housing having a cylindrical lubricant passage, one end of the passage communicating with the lubricant chamber, and the other end of the passage communicating with the annular space outside of the lubricant chamber, and the passage having a longitudinal axis parallel to, but laterally offset from, the longitudinal axis of the housing; and a cylindrical piston sealably slidable within the lubricant passage in response to pressure of drilling fluid entering the passage from the exterior of the housing to force lubricant out of the lubricant passage and into the chamber in order to replace lubricant which is lost therefrom.

3. A downhole drilling tool comprising in combination:

a tubular stem adapted to be connected to a drill string;

a tubular housing, mounted concentrically and rotatably on the stem, forming an annular space bewtween the housing and the stem;

a plurality of bearings within the annular space to support the housing against radial and longitudinal thrust loads;

a plurality of seals within the annular space, above and below the bearings, to form a lubricant chamber, said housing having a cylindrical lubricant passage, one end of the passage communicating with the lubricant chamber, and the other end of the passage communicating with the annular space outside of the lubricant chamber, and the passage having a longitudinal axis laterally offset from the longitudinal axis of the housing;

a cylindrical piston sealably slidable within the lubricant passage in response to pressure of drilling fluid entering the passage from the exterior of the housing to force lubricant out of the passage and into the chamber in order to replace lubricant which is lost therefrom, said piston having a tail on one end to prevent the piston from blocking the end of the passage communicating with the annular space outside of the lubricant chamber;

a downhole drilling motor, having a rotor attached to the lower end of the housing, a stator located within the rotor, and rotation means between the rotor and the stator for rotating the rotor with respect to the stator in response to the flow of drilling fluid through the rotation means; and connection means for connecting the housing to the rotor of the downhole drilling motor.

* * * * *